United States Patent [19]

Littau

[11] Patent Number: 4,683,969
[45] Date of Patent: Aug. 4, 1987

[54] DIMENSIONALLY-ADJUSTABLE STRADDLE-TYPE CROP-WORKING VEHICLE

[76] Inventor: Eugene G. Littau, 8974 Shaw Square Rd., SE., Aumsville, Oreg. 97325

[21] Appl. No.: 780,843

[22] Filed: Sep. 27, 1985

[51] Int. Cl.⁴ .......................... B66C 5/04; B62D 55/06
[52] U.S. Cl. ..................................... 180/6.48; 56/214; 56/328 R; 180/9.23; 180/9.52; 212/218; 280/6 H; 414/460
[58] Field of Search ................. 180/9.5, 9.52, 9, 9.23, 180/9.32, 9.44, 6.48; 280/6 H; 414/459, 460, 461; 56/214, 328 R, 330; 172/292, 611; 212/218, 220

[56] References Cited

U.S. PATENT DOCUMENTS

| | | | |
|---|---|---|---|
| 2,953,229 | 9/1960 | Wiegel | 56/328 R |
| 3,088,531 | 5/1963 | Garrett | 180/9.5 |
| 3,272,362 | 9/1966 | Lamer | 414/461 |
| 3,705,486 | 12/1972 | Chen | 56/330 |
| 3,992,861 | 11/1976 | Edwards | 56/328 R |
| 4,516,503 | 5/1985 | Boccaletti | 414/460 |

FOREIGN PATENT DOCUMENTS

| | | | |
|---|---|---|---|
| 753499 | 2/1967 | Canada | 212/218 |
| 906990 | 2/1954 | Fed. Rep. of Germany | 212/218 |
| 514396 | 9/1922 | France | 180/9.1 |
| 1134328 | 11/1968 | United Kingdom | 212/218 |
| 1082648 | 3/1984 | U.S.S.R. | 414/460 |

Primary Examiner—John J. Love
Assistant Examiner—Everett G. Diederiks, Jr.
Attorney, Agent, or Firm—Kolisch, Hartwell & Dickinson

[57] ABSTRACT

A unitary-frame, straddle-type, crop-working vehicle with independent adjustability of straddle height, track width, and tool position is described. The vehicle features two lower tool-mounting arms and lateral and fore-and-aft adjustment to a center upper tool-mounting arm. Independent height adjustment of each of the vehicle's vertical mast structures facilitates upright hillside operation. Crawler tracks are utilized for ground travel and provide desirable weight distribution during crop-working operations.

3 Claims, 3 Drawing Figures

DIMENSIONALLY-ADJUSTABLE STRADDLE-TYPE CROP-WORKING VEHICLE

BACKGROUND AND SUMMARY OF THE INVENTION

This invention relates to a vehicle for farming operations. More particularly, the invention concerns a dimensionally-adjustable straddle-type crop-working vehicle which is capable of performing farm operations on crops of various heights and row-spacing. The invention further concerns a lightweight vehicle with evenly-distributed weight at its ground-traveling members and which is easily adapted to hillside field operations.

Prior to the general mechanization of farming, crops were planted in rows spaced apart a distance dictated by the plant's requirements, such as proper sunlight penetration, and the necessity for humans or animals to walk between the rows. With the advent of mechanized farm methods, additional spacing between rows of crops was often required to accommodate tractors and other machinery. Accordingly, the time-efficiency provided by such machinery is often accompanied by a reduction in land-use efficiency. Associated problems include nonproductive ground requiring continuous cultivation, weeding, and watering; overabundance of sunlight at ground level which encourages weed growth and loss of moisture; and the tendency of farm vehicle wheels to pack soil adjacent the plant rows, hampering crop root growth between the rows thereby depriving crops of moisture and nutrients in that area.

Conventional farm equipment also fails to provide an effective means for operation on hillsides. Further, conventional tractors are not built to fit between narrow rows or high enough to straddle moderate height crops such as cane berries, grapes, blueberries, and the like. Accordingly, the present invention has the following objects:

(1) to provide a crop-working vehicle that permits rows of crops to be spaced apart the optimum distances for the particular plant rather than a non-optimum distance dictated by the equipment;

(2) to provide a crop-working vehicle with an adjustable width between the ground-contacting members to accommodate working a variety of plants;

(3) to provide a farm vehicle adaptable to hillside operation such that the vehicle and operator maintain a stable, upright attitude;

(4) to provide a crop-working vehicle which can straddle rows of crops, yet which has a center of gravity sufficiently low to afford adequate stabilization;

(5) to provide a crop-working vehicle with an adjustable straddle height;

(6) to provide an agricultural vehicle combining light weight and improved ground contact weight distribution to minimize ground compaction adjacent the rows of crops;

(7) to provide a farm vehicle small enough to be transported on an ordinary truck, yet versatile enough to carry or pull standard farm tools and able to straddle wide, high crops;

(8) to provide a unitary frame vehicle with fore-and-aft stability; and (9) to provide a relatively inexpensive crop-working farm vehicle.

Other objects and features of the present invention will become apparent upon consideration of the following detailed description, such description makes reference to the following drawings.

DETAILED DESCRIPTION OF THE PREFERRED EMBODIMENT

Figure 1:
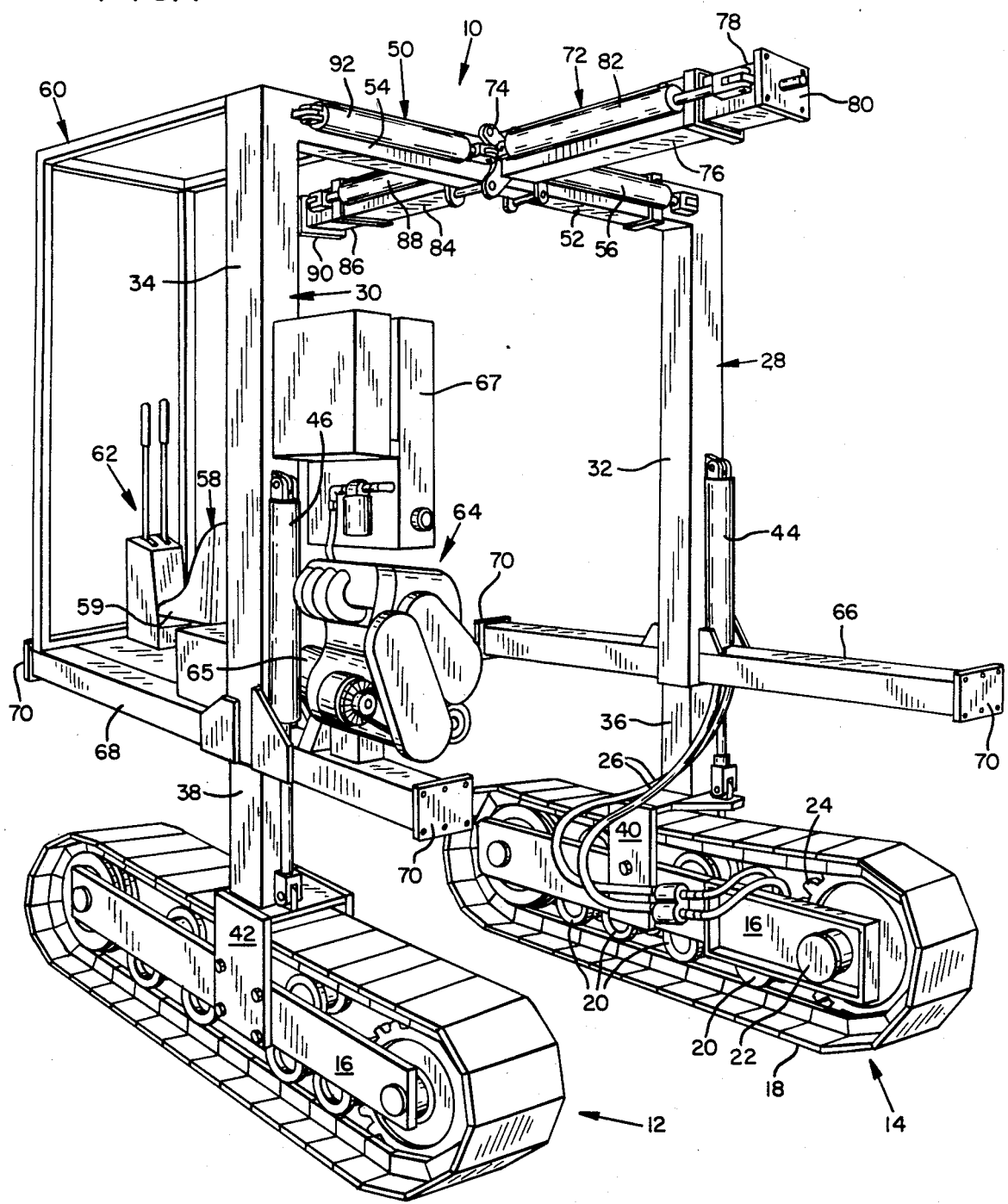
FIG. 1 is a perspective of the crop-working vehicle taken from the rear.
Figure 2:
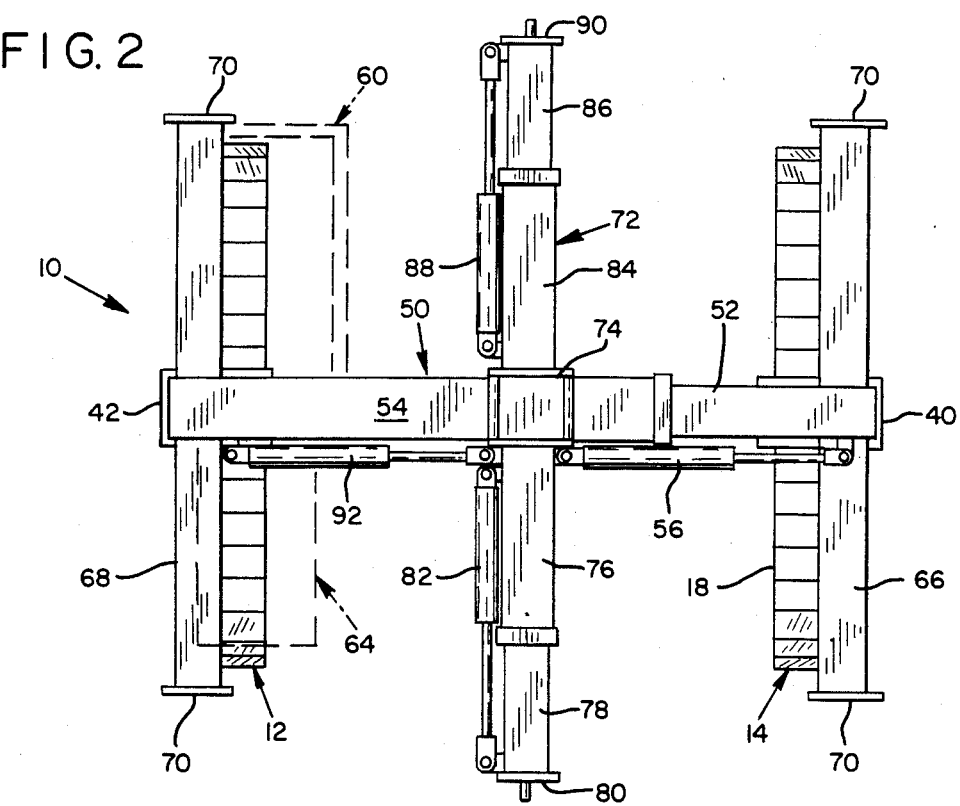
FIG. 2 is a simplified top plan of the crop-working vehicle.

Referring now to the drawings, a vehicle as contemplated is shown generally at 10. The vehicle includes, adjacent its base and on either side of the vehicle, a pair of crawler track assemblies, shown at 12 and 14, which support the vehicle for movement over the ground. The crawler track assemblies are similar in construction; accordingly, only one will be described in detail.

Thus, each comprises an elongate, substantially horizontal traveling frame shown for assembly 14 at 16. Extending about the traveling frame is an elongate crawler track 18. The crawler track is suitably trained for movement about the traveling frame by means including rollers 20. The crawler track has an elongate lower reach contacting the ground. The construction described results in minimal ground compaction upon the vehicle traveling over the ground by reason of the weight distribution which results from the provision of the crawler track.

The crawler track in each crawler track assembly is moved under power to propel the vehicle in forward or reverse directions. Thus, and as shown in FIG. 1 with respect to track assembly 14, partially shown at 22 is a hydraulic motor. Such is drivingly connected to a drive gear 24, the teeth of this gear engaging the crawler track to produce movement of the track with rotation of the gear. Pressurized hydraulic fluid is supplied and exhausted from the motor through hoses partially shown at 26.

In the vehicle described, the crawler tracks constitute ground-traveling means promoting movement of the vehicle. Crawler tracks are preferred because of the reduced compaction of the ground resulting through their use earlier discussed and because they provide optimum fore-and-aft stability to upwardly extending frame structure provided in the vehicle. In some instances, other ground-traveling means might be appropriate, such as a multiplicity of pneumatic tires. Tires, however, because of their cushioning and rebounding characteristics, in some applications tend to result in an undesirable fore-and-aft porpoising action in the traveling frames with the vehicle moving.

Upright masts 28, 30, also referred to as upright mast structures, consist of upright tubular sections 32, 34 and lower upright sections 36, 38. The lower sections are rigidly attached to the traveling frames by means of U-shaped brackets 40, 42. As can be seen in FIG. 1, lower upright sections 36, 38 are preferably square in cross section and are received in passages of similar cross section extending within upright tubular sections 32, 34. The combination of the rigid connection of lower upright sections 36, 38 to traveling frames 16 and the noncircular cross section of the lower upright sections affords stability to masts 28, 30 by maintaining these masts perpendicularly to traveling frame 16 and by resisting any tendency of the masts to twist.

Upper tubular sections 32, 34 are individually extensible from the lower sections through operation of fluid-operated rams 44, 46. Each has a cylinder end connected to an upper section and a rod end connected to a bracket joining a lower section to a traveling frame.

Figure 3:
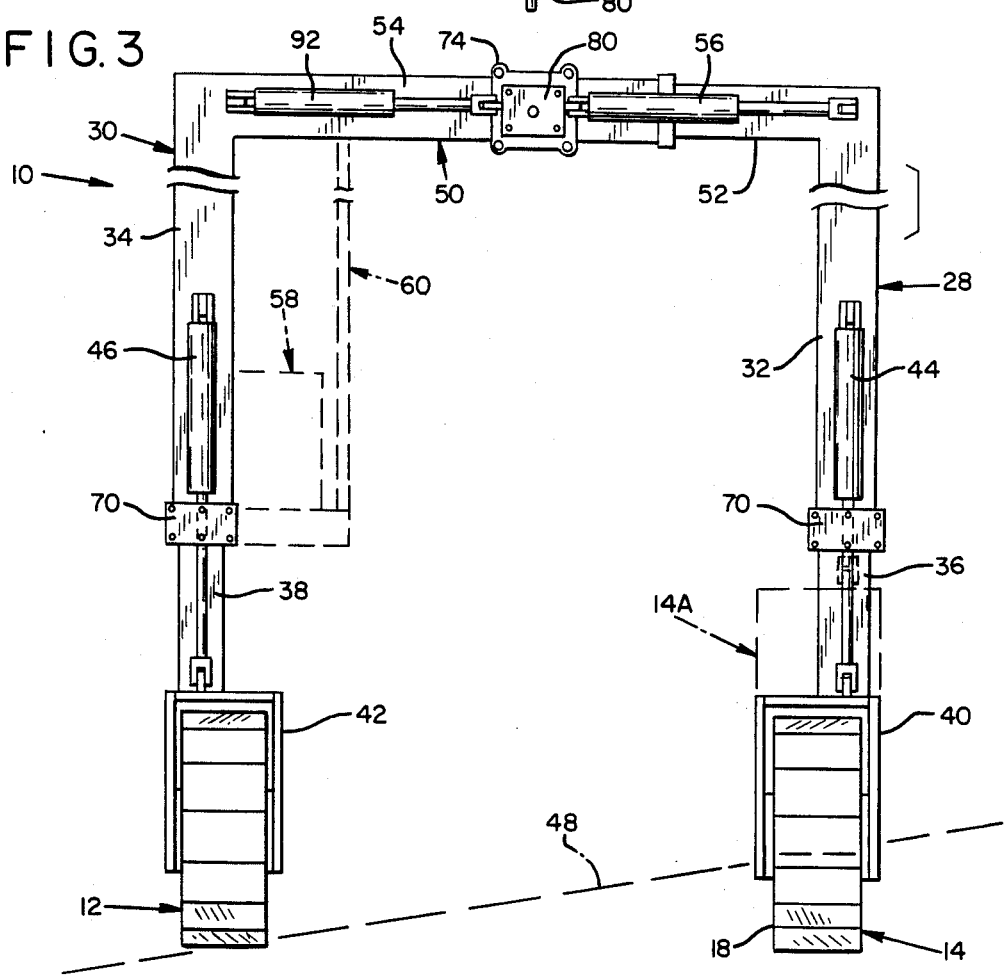
FIG. 3 is a simplified rear elevation of the crop-working vehicle.

Turning to FIG. 3, it can be seen that fluid-operated rams 44, 46, if extended to unequal lengths, render one mast shorter than the other. This type of adjustment readily adapts the vehicle to operations where the vehicle travels transversely of a slope in the ground. Thus, in FIG. 3, track assembly 14 is shown in phantom outline at 14A in a position which is raised relative to the position of track assembly 12. This is done by contracting ram 44 with resultant shortening of mast 28. With this adjustment the vehicle can travel over sloped ground 48 with the mast upright and resultant stability.

Interconnecting mast 28, 30 is horizontal beam assembly 50. This beam assembly comprises a horizontal section 52 which is joined to upper section 32 of mast 28, and a horizontal tubular section 54 which is joined to upper section 34 of mast 30. Section 52 is telescopically received within a passage in horizontal tubular section 54. Operatively interposed between sections 52, 54 is a fluid-operated ram 56 used to produce extension and contraction of the beam assembly.

As with the mast assemblies, horizontal section 52 has a square cross section. The passage within horizontal tubular section 54 has a matching cross section. This noncircular, tubular design affords rigidity to the respective horizontal sections and resists any tendency of the masts to move away from their desired mutually parallel orientation.

What has been just described is a pair of masts, interconnected by a horizontal beam assembly which constitutes the sole structurally unifying framework interconnecting the traveling frame. By reason of this type of structure, the weight of the vehicle tends to be minimized. This has the effect of tending to reduce the compaction effect of the vehicle. Further, maneuverability in the vehicle is enhanced.

Rigidly attached to upright tubular sections 32, 34 of the masts are horizontally extending farm-tool-mounting arms 66, 68. Each is directly adjacent the base of its respective upright tubular section. These mounting arms include bolt plates 70 on the extremities of the arms providing means for coupling any of several types of farm tools which might be utilized in operating the vehicle.

An operator's station 58 is shown mounted adjacent the lower portion of upright tubular section 34. This station includes an operator's seat 59 supported by arm 68 and section 34. It also includes operator controls partially indicated at 62 which the vehicle operator manipulates in controlling movement of the vehicle and extension and contraction of the mast and other structures in the vehicle. Providing protection for the vehicle operator is a cage assembly 60 partially supported on arm 68 and having an upper part secured to and extending from an upper portion of tubular section 34.

Shown at 64 is an internal combustion engine and such is appropriately supported on arm 68. The engine is suitably drivingly connected to a hydraulic pump partially shown at 65 which provides the pressure fluid for operating the vehicle. A fuel supply tank, a reservoir for hydraulic fluid utilized in running the vehicle, and related equipment are provided in the vehicle including housing structure 67. The pump described provides the pressurized hydraulic fluid supplied through hoses 26 which power the hydraulic motors driving the crawler tracks in the crawler track assembly.

An upper farm-tool-mounting arm or arm assembly is illustrated generally at 72. This arm assembly is used in the mounting of implements or tools where it is desirable that such be supported at an elevated height. Specifically, arm assembly 72 includes a carriage portion 74 which is supported on tubular section 54 of the horizontal beam assembly in a manner which permits travel of the carriage portion along the length of the tubular section. Fixed to and extending horizontally outwardly from one side of this carriage portion is a tubular section 76 having a passage of rectangular cross section extending along its interior. Telescopically received within this passage is a tubular member 78 which may be extended and contracted with respect to section 76. The outer extremity of this member has a mounting plate 80 affixed thereto used in the mounting of a working tool or implement. Extension and contraction of member 78 with respect to 76 is performed under power utilizing fluid operated ram 82 having its cylinder end mounted on section 76 and its rod end mounted on member 78.

In a somewhat similar manner, the opposite side of carriage portion 74 has affixed thereto a tubular section 84 extending horizontally outwardly from the carriage portion and having an internal passage of rectangular cross section extending therealong. Telescopically received within this tubular section is a tubular member 86. Extension and contraction of this tubular member with respect to section 84 is performed under power utilizing ram 88 operatively interposed between the tubular section and member 86. Mounted on the remote end of member 86 is a mounting plate 90.

Movement of the carriage portion along the lengths of tubular section 54 is produced utilizing fluid operated ram 92 which has its cylinder end connected to section 54 and its rod end operatively mounted on the carriage portion.

The structure just described provides a great deal of flexibility in the mounting of a tool or implement from an elevated position in the vehicle. This flows from the type of adjustable extensibility provided in the arm assembly and the capability of moving the arm assembly to adjusted positions along the length of the beam assembly interconnecting the mast.

The operation of the vehicle as has been described should be obvious. To propel the vehicle in either a forward or reverse direction, the operator, through suitable adjustments in the vehicle controls, operates the hydraulic motors in the crawler track assemblies to produce the movement desired. Turning or steering of the vehicle is accomplished by moving one crawler track assembly at a different speed or direction than the crawler track of the other assembly. During such movement the masts are maintained upright with maximum stability to the operator whose operator's station is incorporated with one of the masts. The visibility of the operator is excellent, which includes excellent visibility of the tracks which support the vehicle and the paths such move along in traversing the ground.

The structurally interconnecting framework which interconnects the traveling beams in the crawler track assemblies has minimal mass, contributing to lack of overall weight in the vehicle. This is important in reducing the compaction effects of the crawler tracks. The type of mast construction selected minimizes the necessary length of the vehicle.

The lateral spacing of the crawler track assemblies is readily adjusted by varying the length of beam assembly 50 interconnecting the mast in the framework. In this way the vehicle is placed in condition to handle a vast variety of row crop spacings. Of particular importance, the individual masts in the vehicle are adjustably extensible whereby the vehicle is readily used in the working of a field while traversing a slope in the field.

The design further provides a great deal of flexibility in the mounting of tools or implements used in conjunction with the vehicle. These can be mounted at either or both ends of the vehicle simultaneously and at different mounting elevations. When utilizing arm assembly 72, the mounting of a tool or implement may be shifted in a direction extending axially of the vehicle as well as in a direction extending transversely of the vehicle.

While a particular embodiment of the invention has been described, it is appreciated that variations and modifications are possible without departing from the invention. It is desired, therefore, to cover all such modifications and variations as would be apparent to one of ordinary skill in the art.

It is claimed and desired to secure by Letters Patent:

1. A crop-working, straddle-type vehicle comprising: first and second elongate horizontal traveling frames, laterally spaced from each other in the vehicle;
ground-traveling means mounted on each of the traveling frames whereby each frame is movable over the ground in a stable manner;
a pair of hydraulic motors, one for each ground-traveling means, drivingly connected to the ground-traveling means;
a single, upright mast joined to and extending upwardly from one of said frames and another single, upright mast joined to and extending upwardly from the other of said frames, each mast having an elongate lower section fixed to a traveling frame and an elongate upper section forming the upper part of the mast adjustably extensible from the lower section, and power-operated means interposed between the sections for producing adjustable extension of the upper section from the lower section;
a motor-driven pump positioned adjacent and mounted on one of said masts, supplying pressurized hydraulic fluid to said hydraulic motors;
a substantially horizontal beam assembly interconnecting upper extremities of the upper sections of said first-mentioned and other mast whereby the masts depend from the horizontal beam assembly and the masts and beam assembly form a channel-shaped arch defining a passage for the movement of a crop therethrough, said masts and said horizontal beam assembly constituting the sole structurally unifying framework interconnecting said traveling frames; and
an operator's station including means for carrying an operator, and support means for the operator's station having the operator's station mounted thereon, said support means being joined to one of said masts and extending longitudinally of the vehicle and positioning the station below the horizontal beam assembly and above a ground-traveling frame and at one side of the passage defined by the channel-shaped arch.

2. A crop-working, straddle-type vehicle comprising: first and second elongate horizontal traveling frames laterally spaced from each other in the vehicle;
an elongate crawler track trained about each frame and having a lower reach contacting the ground and providing fore-and-aft stability to the traveling frame;
a single upright mast joined to and extending upwardly from one of said frames and another single upright mast joined to and extending upwardly from the other of said frames;
each of said masts including a lower section of square cross section fixed to the traveling frame and an upper section telescopically received over the lower section with matching cross section to the lower section, fluid-operated ram means for each mast for producing relative extension and contraction of the upper and lower sections in the mast;
an opertor's station mounted on the upper section of one mast;
a substantially horizontal beam assembly interconnecting the upper extremities of said upper mast sections, said masts and said horizontal beam assembly constituting the sole structurally unifying framework interconnecting said traveling frames, said horizontal beam assembly consisting of two telescoping members of square cross section being adjustably extensible whereby the lateral spacing between the frames is adjustable, fluid-operated ram means for producing extension and contraction of the horizontal beam assembly; and
a pair of hydraulic motors, one for each crawler track, each mounted on a traveling frame and drivingly connected to the crawler track trained about the frame, and a motor-driven pump supported on one of said masts supplying pressurized hydraulic fluid to said motors.

3. A crop-working, straddle-type vehicle comprising: first and second elongate horizontal traveling frames, laterally spaced from each other in the vehicle;
ground-traveling means mounted on each of the traveling frames whereby each frame is movable over the ground in a stable manner;
a single upright mast joined to and extending upwardly from one of said frames and another single, upright mast joined to an extending upwardly from the other of said frames, each mast having an elongate lower section of noncircular cross section fixed adjacent its base to a traveling frame between the ends of the frame and an elongate upper section adjustable extensible from the lower section with an internal passage matching the cross section of the lower section and telescopically received about the lower section, each mast further having power-operated means interposed between the sections of the mast for producing adjustable extension of the upper section from the lower section;
a substantially horizontal beam assembly interconnecting upper extremities of the upper sections of said first-mentioned and other mast whereby the masts depend from the horizontal beam assembly and the mast and beam form a channel-shaped arch defining a passage for the movement of the crops therethrough, said masts and said horizontal beam assembly constituting the sole structural unifying framework interconnecting said traveling frames; and
an operator's station including means for carrying an operator, and support means for the operator's station having the operator's station mounted thereon, said support means being joined to the base of the upper section of one of the masts and extending longitudinally of the vehicle and positioning the station below the horizontal beam assembly and above a ground-traveling frame and at one side of the passage defined by the channel-shaped arch.

* * * * *